United States Patent
Kohler et al.

(10) Patent No.: US 8,718,269 B2
(45) Date of Patent: May 6, 2014

(54) RISKS FOR WAITING FOR WELL-MATCHED

(71) Applicant: Avaya Inc., Basking Ridge, NJ (US)

(72) Inventors: Joylee Kohler, Colorado Springs, CO (US); Robert C. Steiner, Broomfield, CO (US); Andrew D. Flockhart, Thornton, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/623,255

(22) Filed: Sep. 20, 2012

(65) Prior Publication Data

US 2014/0079210 A1    Mar. 20, 2014

(51) Int. Cl.
*H04M 3/00*     (2006.01)
*H04M 5/00*     (2006.01)

(52) U.S. Cl.
USPC ............ 379/265.12; 379/265.05; 379/265.11; 379/266.06

(58) Field of Classification Search
USPC ............. 379/265.12, 266.06, 265.02, 266.01, 379/265.11, 265.01, 266.08, 265.05, 379/265.08, 266.02
See application file for complete search history.

(56) References Cited

U.S. PATENT DOCUMENTS

| | | | |
|---|---|---|---|
| 6,707,903 B2 * | 3/2004 | Burok et al. | 379/265.02 |
| 6,741,698 B1 * | 5/2004 | Jensen | 379/265.02 |
| 7,860,234 B2 * | 12/2010 | Patakula et al. | 379/266.06 |
| 2009/0122973 A1 | 5/2009 | Jay et al. | |
| 2010/0235218 A1 | 9/2010 | Erhart et al. | |
| 2010/0296417 A1 | 11/2010 | Steiner | |
| 2011/0125793 A1 | 5/2011 | Erhart et al. | |
| 2011/0125826 A1 | 5/2011 | Erhart et al. | |
| 2011/0206199 A1 * | 8/2011 | Arora | 379/266.01 |
| 2011/0255683 A1 | 10/2011 | Flockhart et al. | |

* cited by examiner

*Primary Examiner* — Thjuan K Addy
(74) *Attorney, Agent, or Firm* — Sheridan Ross P.C.

(57) ABSTRACT

A contact center which provides the ability to, among other things, support deferring work assignment decisions while simultaneously assessing the risks associated with such a deferred decision. The intelligent deferment of work assignment decisions helps to achieve better matching without losing the opportunity to timely assign work to an agent.

20 Claims, 4 Drawing Sheets

RISKS FOR WAITING FOR WELL-MATCHED

FIELD OF THE DISCLOSURE

The present disclosure is generally directed toward communications and more specifically toward contact centers.

BACKGROUND

Sophisticated contact centers attempt to match a customer to the most-qualified agent. This has many benefits including increased customer satisfaction as well as a higher potential for increasing contact center revenue/decreasing contact center costs. The objective of having a well-matched agent and customer is often contrary to other objectives in the contact center such as minimizing customer wait time, minimizing agent idle time, etc. Because of these contradicting objectives, contact centers often forego deferring any match to wait for a well-matched situation.

There are times when deferring a work assignment decision is safe and times when it is not safe. Most contact centers do not consider the risks associated with waiting to defer decisions, but rather apply a one-size-fits-all routing algorithm. In particular, the risk of customer abandon is of special concern.

The problem with the approach described above is that there are many situations where it would actually benefit all aspects of the contact center to wait for a better agent-to-customer match. The problem is determining when it is better to hold on and wait and when it is better to fold and just take the next available customer/agent.

SUMMARY

It is with respect to the above issues and other problems that the embodiments presented herein were contemplated. In particular, embodiments of the present disclosure propose the ability to create a pool of agents that are (1) qualified to handle a particular contact/work item from a particular customer or a particular type of contact/work item but (2) are not considered "well-matched" agents because their skill level for the contact/work item is not as high as other agents in the contact center.

The present disclosure allows the routing logic of the contact center (e.g., a work assignment engine) to delay a routing decision for a contact/work item while keeping an eye on the pool of qualified but not well-matched agents. The routing decision for the contact/work item can be delayed unless it is determined that the risk of waiting for a well-matched and available agent has passed a particular risk tolerance. The risk tolerance for waiting can be based on the rate at which the pool of qualified but not well-matched agents is decreasing, the absolute number of agents in the pool of qualified but not well-matched agents, and/or the rate of incoming contacts that will consume the pool of qualified but not well-matched agents. By analyzing the pool of qualified but not well-matched agents, the routing logic can more intelligently determine whether it is okay to try and wait for a better agent or whether the risk of waiting is outweighed by the risk of losing access to the pool of qualified by not well-matched agents.

Embodiments of the present disclosure build upon the concepts described in U.S. patent application Ser. No. 13/457,253 entitled "WORK ASSIGNMENT DEFERMENT DURING PERIODS OF AGENT SURPLUS" to Flockhart et al., the entire contents of which are hereby incorporated herein by reference. In particular, embodiments of the present disclosure provide a mechanism by which work assignment deferment can be made with a simultaneous consideration of the risks associated with such a deferment.

The routing logic may also consider Weighted Advance Time (WAT) as part of its risk analysis. Specifically, if WAT is big (e.g., larger than a predetermined threshold), then delaying the routing decision is more risky because there is not many opportunities after an agent availability. More specifically, WAT, wait time, and a target wait time (objective) can be used to determine the number of "opportunities" a customer will have to be served before there is a failure to meet the objective. A simple equation that could be used to calculate the number of opportunities is (objective-wait time)/WAT. This number of opportunities may be the value that is analyzed to determine whether the risk of waiting is tolerable or not (e.g., the risk threshold can be defined by the number of remaining opportunities).

Even more sophisticated routing logic may be able to predict wait time for a well-matched agent to become available for the contact. If the predicted wait time for the well-matched agent is projected to be less than a predicted time at which the pool of qualified but not well-matched agents goes away, the routing logic can decide to defer a routing decision. This deferment may continue until the well-matched agent becomes available, until the risk of losing the pool of qualified by not well-matched agents is too great, or until a predetermined amount of time has passed since the contact entered the contact center.

A feedback loop may also be used to automatically adjust the risk tolerance applied by the routing logic. Specifically, failure rates of missing well-matched opportunities can be measured and used to automatically adjust when the routing logic should stop waiting for a well-matched agent and simply assign the contact to an agent from the pool of qualified but not well-matched agents.

Another aspect of the present disclosure, alone or in combination with the other above-described embodiments, would be to allow a customer's individual wait tolerance to be considered. This can be determined by analyzing historical information for that customer or by directly asking the customer if they have tolerance for waiting beyond the objective time for a better match.

In accordance with at least some embodiments of the present disclosure, a method is provided which generally comprises:

receiving a first contact in a contact center;

creating a first work item as a representation of the first contact in the contact center;

establishing a pool of agents within the contact center, each agent in the pool of agents being qualified to process the first work item but also not being considered a well-matched agent for the first work item because they are not as qualified to process the first work item as at least one other well-matched agent in the contact center, wherein the at least one other well-matched agent is not available at the first time; and deferring a work assignment decision for the first work item beyond the first time while simultaneously considering a risk of not assigning the first work item to an agent in the pool of agents.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
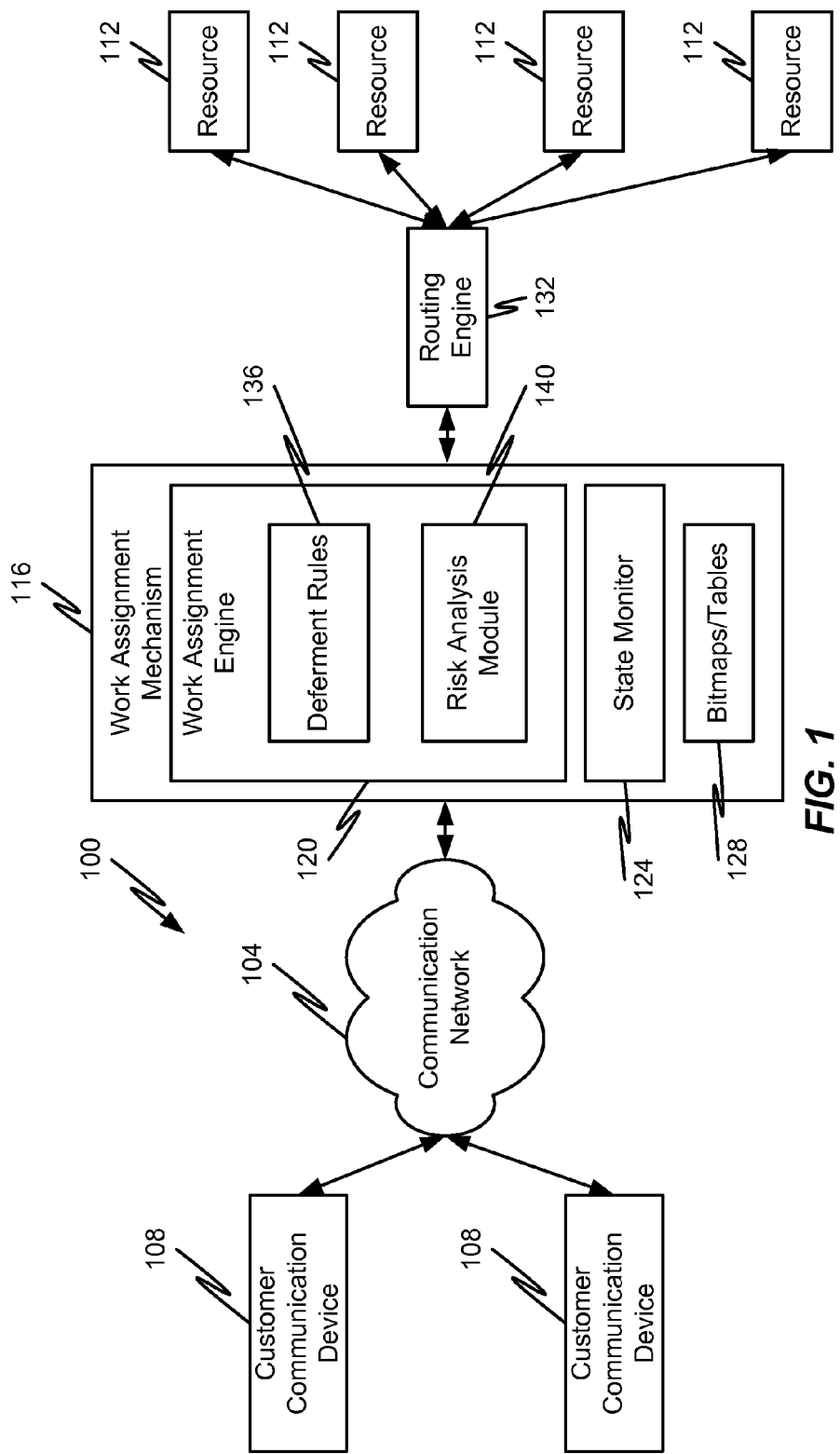
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering a contact center in which a plurality of resources 112 are distributed to handle work items (in the form of contacts) from the customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof.

In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, filed Mar. 20, 1010, Feb. 17, 2010, and Feb. 17, 2010, respectively, each of which are hereby incorporated herein by reference in their entirety.

The format of the work item may depend upon the capabilities of the communication device 108 and the format of the communication. In some embodiments, work items are logical representations within a contact center (e.g., the work assignment mechanism 116 of the contact center) of work to be performed in connection with servicing a communication/contact received at the contact center. The communication or contact associated with a work item may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 132 to connect the communication device 108 which initiated the communication with the assigned resource 112. The connection between the customer communication device 108 and a resource 112 may be effected by the routing engine 132 assigning one or more communication resources (e.g., sockets, buffers, physical ports, etc.) to establish a communication path (e.g., media stream such as RTP or SRTP) between the communication device 108 and resource 112. In some embodiments, the communication path established between the communication device 108 and resource 112 may also carry call control signaling, however, it may also be possible to maintain the signaling path at the work assignment mechanism 116. Alternatively, the customer communication device 108 may be initially connected to a conference bridge or the like by the routing engine 132 before any resource 112 is assigned to the contact. The work assignment mechanism 116 may later decide which resource(s) 112 are going to be assigned to the contact and, upon making such a decision, instruct the routing engine 132 to connect the selected resource(s) 112 to the conference bridge where the contact is being parked.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, tablet, Personal Digital Assistant (PDA), cellular phone, smart phone, telephone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112 connected to the work assignment mechanism 116.

In some embodiments, the work assignment mechanism 116 comprises a work assignment engine 120 which enables the work assignment mechanism 116 to make intelligent routing decisions for work items. In some embodiments, the work assignment engine 120 is configured to administer and make work assignment decisions in a queueless contact center, as is described in U.S. patent application Ser. No. 12/882,950, the entire contents of which are hereby incorporated herein by reference.

More specifically, the work assignment engine 120 can generate bitmaps/tables 128 and determine, based on an analysis of the bitmaps/tables 128, which of the plurality of processing resources 112 is eligible and/or qualified to receive a work item and further determine which of the plurality of processing resources 112 is best suited to handle the processing needs of the work item. As will be discussed in further detail herein, the work assignment engine 120 may comprise one or more rule sets for making intelligent work item routing decisions, which in some embodiments may actually be a decision to defer a work item routing decision.

In situations of work item surplus, the work assignment engine 120 can also make the opposite determination (i.e., determine optimal assignment of a work item to a resource 112). In some embodiments, the work assignment engine 120 is configured to achieve true one-to-one matching by utilizing the bitmaps/tables 128 and any other similar type of data structure.

The work assignment engine 120 may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

In addition to comprising the work assignment engine 120, the work assignment mechanism 116 may also comprise a state monitor 124. The state monitor 124 may be configured to monitor and assess the state of the contact center 100 on a continual or periodic basis and provide results of its assessment to the work assignment engine 120. Specifically, the state monitor 124 may provide its analysis information to the work assignment engine 120 to assist the work assignment engine 120 in making work item routing decisions. In some embodiments, the input from the state monitor 124 may be used as inputs to the risk analysis module 140 and/or deferment rules 136 contained within the work assignment engine 120. The variables or considerations used by the risk analysis module 140 to determine if a work assignment should be deferred can be provided directly by the state monitor 124.

In particular, the deferment rules 136 may be similar to the deferment rules described in U.S. patent application Ser. No. 13/457,253 in that they may comprise thresholds, algorithms, criteria, or the like for determining whether and when a work item decision should be deferred. The risk analysis module 140 may provide a feedback mechanism to the deferment rules 136 that considers a state of the contact center and, based on the determined state of the contact center, whether the deferment rules 136 should be allowed to defer a work assignment decision or whether the default deferment rules 136 should be ignored/overridden to avoid the risk of waiting for a better-suited agent for the work item.

Specifically, the state monitor 124 may be responsible for monitoring one or more agent performance metrics (e.g., KPIs, schedule adherence, overall profitability, skill improvements, etc.) for some or all agents in the contact center 100 and comparing those metrics with one or more Service Level Objectives or SLOs. The results of these comparisons may be provided to work assignment engine 120 to assist in making work item routing decisions.

The state monitor 124 may also be configured to analyze properties of a pool of agents that are currently available to handle a contact, but are not considered the best agent within the contact center to process the contact. As used herein, agents that are placed within such a pool of agents may be considered available but not well-matched agents. The risk analysis module 140 may be configured to determine whether the agents within the pool of available but not well-matched agents are being assigned to other projects (e.g., leaving the pool by becoming not available) and, if so, whether the contact should be assigned to an agent from the pool before such an option becomes obsolete.

Information monitored by the state monitor 124 may include information which describes an agent's current or historical (e.g., past hour, day, week, month, quarter, year, recent work assignment history, etc.) performance within the contact center and/or an agent's current availability. In some embodiments, the state monitor 124 may provide KPI information that is obtained from the work assignment engine 120 or from some other analysis and reporting module running within the contact center. As used herein, KPIs may include, without limitation, any metric or combination of metrics that define performance of an entity within a contact center (e.g., a contact center agent, a group of contact center agents, etc.). Specifically, a KPI can be defined in terms of making progress toward strategic goals or simply the repeated achievement of some level of an operational goal.

The state monitor 124 may also be configured to analyze one or more KPIs of a work item or a collection of work items within the contact center. For instance, the state monitor 124 may be configured to analyze WAT for a group of work items, actual wait time for a work item, estimated wait time for a work item, etc.

In a contact center context, KPIs may vary depending upon whether work items correspond to outbound contacts (e.g., contacts originated by the contact center) or inbound contacts (e.g., contacts received at the contact center that have been originated outside the contact center). Non-limiting examples of outbound contact KPIs include: Contacts per hour—Average number of customers a call center agent was able to contact within an hour; Leads Conversion Rate—The percentage of leads that actually converted to sales; Hourly Sales—The average amount of sales the call center representative was able to close in an hour; Daily Sales—The average value of sales the agent was able to close in a day; and Accuracy—Extent to which a contact has been handled according to a predetermined script.

Non-limiting examples of inbound contact KPIs include: Real time Q—Metrics; Calls per hour—The average number of calls the agent is able to take per hour; Saves/One-Call Resolutions—The number of times our agents are able to resolve an issue immediately within the first phone call. Colloquially referred to as "one-and-done" calls; Average Handle Time—How long it takes for one call to be handled, which includes the call time itself, plus the work done after that call; Average Wait Time—How long a caller is put on hold before a call center agent becomes available to take the call; Accuracy; Abandonment Rate—This is the percentage of customers who disconnected before an agent was able to intercept the call; and Completion Rate—The ratio of successfully finished calls to the number of attempted calls by the customer.

Other types of KPIs that are not necessarily specific to inbound or outbound contacts include, without limitation, customer satisfaction level, customer service level, average speed of answer, contact forecast precision level, quality of services rendered, average handling cost of a contact, agent occupancy ratio, schedule adherence and conformity, and time distribution (in service, non-service detailed time or "shrinkage"). Other examples include number of times calls are put on hold, number of transfers, $/min, $/call, number of upsells, number of cross-sells, etc.

As can be appreciated, the state monitor 124 and/or bitmaps/tables 128 may be internal to the work assignment mechanism 116 or they may be separate from the work assignment mechanism 116. Likewise, certain components of the work assignment engine 120 (e.g., deferment rules 136 and/or the risk analysis module 140) do not necessarily need to be executed within the work assignment engine 120 and may be executed in different parts of the contact center 100.

Figure 2:
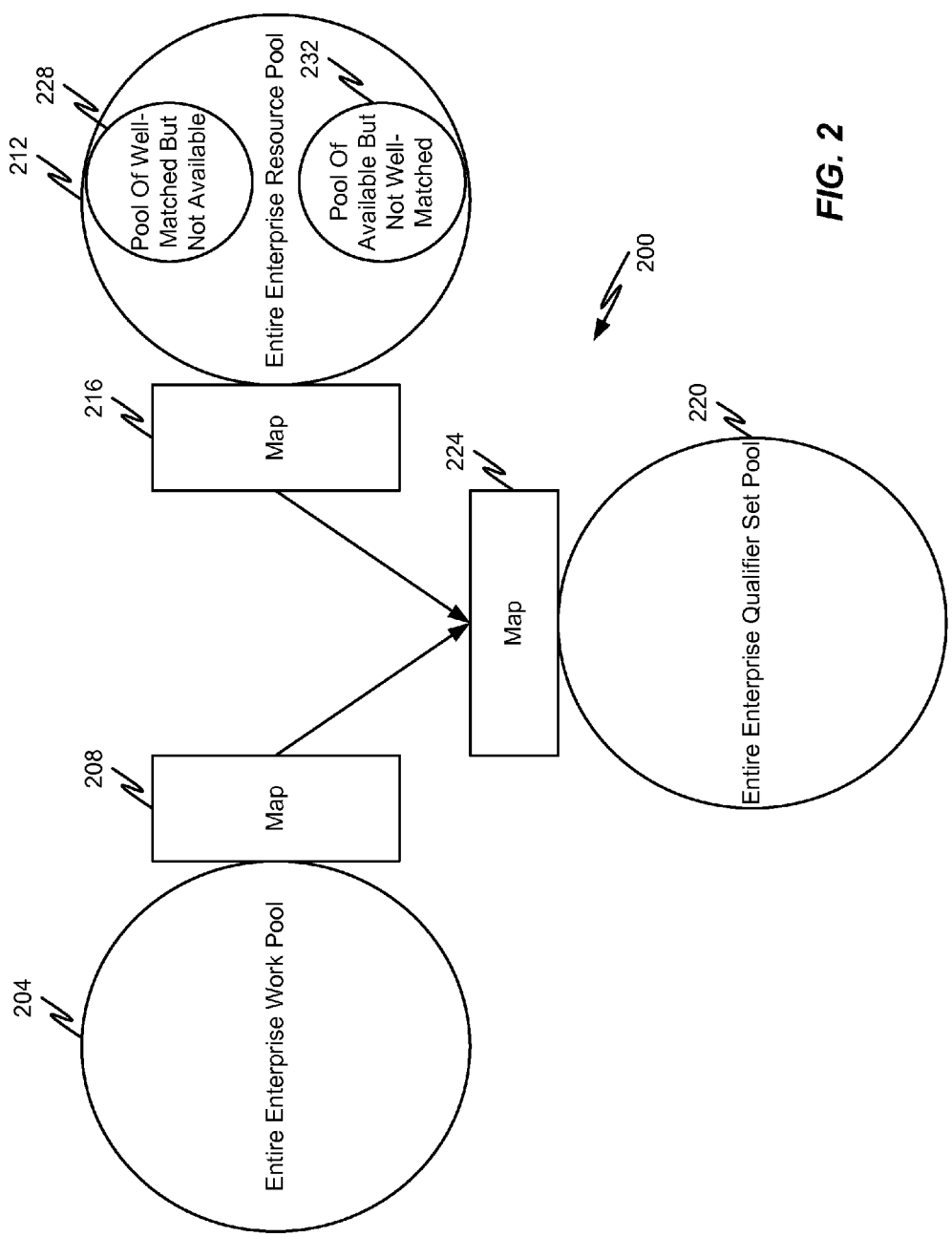
FIG. 2 is a block diagram depicting pools and bitmaps that are utilized in accordance with embodiments of the present disclosure.

FIG. 2 depicts exemplary data structures 200 which may be incorporated in or used to generate the bitmaps/tables 128 used by the work assignment engine 120. One or more of these data structures may also be analyzed by the risk analysis module 140 (e.g., via inputs received from the state monitor 124). The exemplary data structures 200 include one or more pools of related items. In some embodiments, three pools of items are provided, including an enterprise work pool 204, an enterprise resource pool 212, and an enterprise qualifier set pool 220. The pools are generally an unordered collection of like items existing within the contact center. Thus, the enterprise work pool 204 comprises a data entry or data instance for each work item within the contact center 100 at any given time.

In some embodiments, the population of the work pool 204 may be limited to work items waiting for service by or assignment to a resource 112, but such a limitation does not necessarily need to be imposed. Rather, the work pool 204 may contain data instances for all work items in the contact center regardless of whether such work items are currently assigned and being serviced by a resource 112 or not. The differentiation between whether a work item is being serviced (i.e., is assigned to a resource 112) may simply be accounted for by altering a bit value in that work item's data instance. Alteration of such a bit value may result in the work item being disqualified for further assignment to another resource 112 unless and until that particular bit value is changed back to a value representing the fact that the work item is not assigned to a resource 112, thereby making that resource 112 eligible to receive another work item.

Similar to the work pool 204, the resource pool 212 comprises a data entry or data instance for each resource 112 within the contact center. Thus, resources 112 may be accounted for in the resource pool 212 even if the resource 112 is ineligible due to its unavailability because it is assigned to a work item or because a human agent is not logged-in. The ineligibility of a resource 112 may be reflected in one or more bit values. As discussed in further detail herein, the eligibility of a resource 112 may differ from the availability of that resource 112 to handle work as determined by the deferment rules 136, 140. Specifically, depending upon an agent's assigned tier according to one or more deferment rules 136, 140, an agent may actually be available to handle work items, but may be ineligible to handle work items of a particular type (e.g., skill requirement). The available but ineligible status of an agent may allow the deferment rules 136 to actually defer work item routing decisions for a period of time, perhaps in the hope that a better qualified agent will become available and eligible in the meantime. Similarly, the risk analysis module 140 may be configured to monitor the attributes of some or every resource within the resource pool 212 to determine the risks of waiting for a well-matched agent.

The resource pool 212 may, in some embodiments, comprise two non-overlapping sub-pools of resources—a pool of well-matched but not available agents 228 and a pool of available but not well-matched agents 232. In some embodiments, agents from the resource pool 212 may be assigned to either pool 228, pool 232, or neither pool 228 and pool 232. In other words, an agent will not be able to simultaneously be assigned to both pools 228, 232. The assignment of an agent to one of the pools 228, 232 may be controlled and/or represented by changing a bit value in the corresponding agent's attribute set. For example, a first bit field may be used for indicating assignment (or lack thereof) to pool 228 (e.g., '0' indicates lack of assignment and '1' indicates assignment) whereas a second bit field may be used for indicating assignment (or lack thereof) to pool 232.

The qualifier set pool 220 comprises a data entry or data instance for each qualifier set within the contact center. In some embodiments, the qualifier sets within the contact center are determined based upon the attributes or attribute combinations of the work items in the work pool 204. Qualifier sets generally represent a specific combination of attributes for a work item. In particular, qualifier sets can represent the processing criteria for a work item and the specific combination of those criteria. Each qualifier set may have a corresponding qualifier set identified "qualifier set ID" which is used for mapping purposes. As an example, one work item may have attributes of language=French and intent=Service and this combination of attributes may be assigned a qualifier set ID of "12" whereas an attribute combination of language=English and intent=Sales has a qualifier set ID of "13." The qualifier set IDs and the corresponding attribute combinations for all qualifier sets in the contact center may be stored as data structures or data instances in the qualifier set pool 220.

In some embodiments, one, some, or all of the pools may have a corresponding bitmap. Thus, a contact center may have at any instance of time a work bitmap 208, a resource bitmap 216, and a qualifier set bitmap 224. In particular, these bitmaps may correspond to qualification bitmaps which have one bit for each entry. Thus, each work item in the work pool 204 would have a corresponding bit in the work bitmap 208, each resource 112 in the resource pool 212 would have a corresponding bit in the resource bitmap 216, and each qualifier set in the qualifier set pool 220 may have a corresponding bit in the qualifier set bitmap 224.

Figure 3:
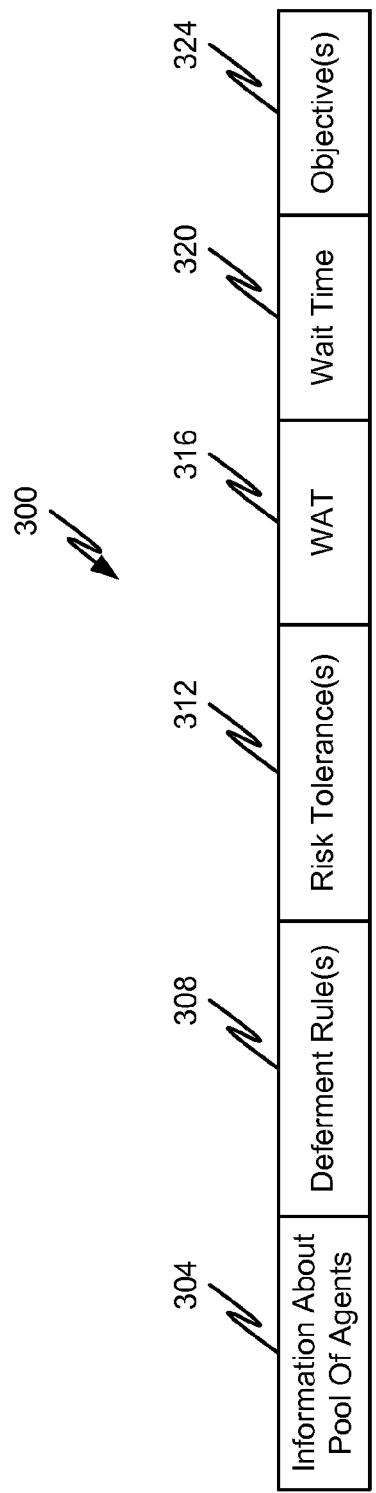
FIG. 3 is a block diagram depicting a data structure in accordance with embodiments of the present disclosure.

With reference now to FIG. 3, a data structure 300 that may be used by or included in either the deferment rules 136 or risk analysis module 140 will be described in accordance with embodiments of the present disclosure. The data structure 300 may comprise a number of data fields that enable the deferment rules 136 and risk analysis module 140 to be invoked to intelligently defer work item routing decisions based on the current state of the contact center 100. In some embodiments, the fields in the data structure 300 include an agent information field 304, a deferment rule(s) field 308, a risk tolerance(s) field 312, a WAT field 316, a wait time field 320, and an objective(s) field 324. Although the data structure 300 is depicted as a single data structure, it should be appreciated that some of the fields depicted in FIG. 3 may be included in one data structure whereas other fields may be included in a different data structure. As a non-limiting example, the data fields related to pools of agents (e.g., fields 304, 316) may be maintained in a first data structure whereas data fields related to work items (e.g., fields 308, 312, 320, 324) may be maintained in a second data structure. The illustrative data structure 300 is shown as a single data structure for convenience of discussion and should not be construed as limiting embodiments of the present disclosure to a single data structure 300.

As can be appreciated, one or more of the fields included in the data structure 300 may be incorporated into one or both of the deferment rules 136 and risk analysis module 140, as appropriate.

The agent information field 304 may comprise information specific to an agent or group of agents (e.g., one or both pools 228, 232). When specific to an agent, the agent information field 304 may comprise agent identification information, whether the agent is a well-matched agent or not for a particular work item, what types of work items the agent is well-matched for, agent-specific KPIs, agent skills/attributes, agent location, whether the agent belongs to either pool 228 or 232, whether the agent is current available, etc. When specific to a group of agents, the agent information field 304 may comprise information describing the number of agents in the group (e.g., the current number of agents in pool 228 or pool 232), how the group size and/or quality is changing over time (e.g., whether the number of the agents in pool 228 or pool 232 is increasing, decreasing, or staying constant, the rate at which the size of the pool 228, 232 is changing, the average skill level(s) of agents within the group, the estimated processing time for agents to handle a work item of a certain type, etc.), the estimated number of agents in the group at a particular time in the future (e.g., an estimation of when no agents will be available in pool 232, an estimation of when an agent will leave pool 228 and become available to handle a work item, etc.), and combinations thereof. The agent information field 304 can be used to store a variety of agent or group information.

The deferment rule(s) field 308 may store various types of information regarding whether and for how long a work assignment decision should be deferred. More specifically, the deferment rule(s) field 308 may contain one or more thresholds that define when a work assignment decision should be deferred. The deferment rule(s) field 308 may also contain information that defines the maximum amount of time that a work assignment decision should be deferred. Any other information described herein that relates to determining whether and to what extent a work assignment should be deferred may be maintained within the deferment rule(s) field 308.

The risk tolerance(s) field 312 may comprise information that can be used by the risk analysis module 140 to determine whether the risks associated with deferring a work assignment decision outweigh the benefits associated therewith. More specifically, information in the risk tolerance(s) field 312 may describe situations or rules under which a work assignment decision should not longer be deferred. Even if the deferment rule(s) 308 define that the work assignment decision should be deferred, the information contained within the risk tolerance(s) 312 may supersede the deferment rule(s) 308. In some embodiments, the information in the risk tolerance(s) field 312 may be created by an administrator of the contact center. It may be possible, however, to also allow a customer or initiator of a contact to further refine the risk tolerance(s) field 312. Specifically, a customer may be asked whether they are willing to wait for a well-matched agent even though a non-well-matched agent is currently available. If the customer indicates a willingness to wait, the customer may also be asked how long they are willing to wait. This information may be provided as feedback to adjust the risk tolerance(s) 312 for that specific customer with respect to their current contact and possibly with respect to future contacts.

The WAT field 316 may comprise information for calculating the WAT of a particular work item, the WAT of a set of work items, etc. In some embodiments, the WAT is the measure of the average time that is required for a work item to advance one position. In a contact center employing traditional queues, such as skill-based queues, the WAT may correspond to the average time required for the work item to advance one position within a queue. In a queueless contact center, the WAT may correspond to the average amount of time for a similar type of work item to be processed by a resource 112. Accordingly, the WAT may be calculated as a continuously updated average advance time. As can be appreciated by one of ordinary skill in the art, the time period over which advance times are averaged for a queue or type of work item can be varied. The WAT, in some embodiments, provides a measure of risk associated with delaying a work assignment decision. In some embodiments, a WAT threshold may be contained in the risk tolerance(s) field 312. If the WAT calculated for a particular work item becomes too large (e.g., larger than the WAT threshold), then delaying the work assignment decision has become too risky and deferment of the decision may be discontinued.

The wait time field 320 may comprise wait time information for a specific work item, a specific group of work items (e.g., work items of a common type), actual wait time, estimated wait time, or combinations thereof. The wait time field 320 may also comprise information that describes how long agents have been waiting in the pool of available but not well-matched agents 232. This information can also be integrated into the deferment rule(s) 308 and/or risk tolerance(s) 312.

Likewise, the objective(s) field 324 may comprise information describing one or more objectives within a contact center. The objectives may be specific to a particular KPI (e.g., a maximum threshold for actual or estimated wait time, a maximum target for profit/contact, a goal for agent occupancy, any other known type of Service Level Objective (SLO), or combinations thereof). In some embodiments, the WAT, wait time, and an objective for wait time (target wait time) can be used to determine a number of opportunities a customer will have to be served before there is a failure to meet the objective. An equation of (objective−wait time)/WAT can result in the calculation of the opportunities and a corresponding opportunity threshold can be stored in the risk tolerance(s) field 312. The risk analysis module 140 may be configured to analyze the calculated opportunity number and compare it with the opportunity threshold stored in the risk tolerance(s) field 312. If the calculated value is less than the opportunity threshold, then the risk analysis module 140 may stop the work assignment engine 120 from continuing to defer a work assignment decision and a corresponding work item may be assigned to an agent from the pool of available but not well-matched agents 232.

Figure 4:
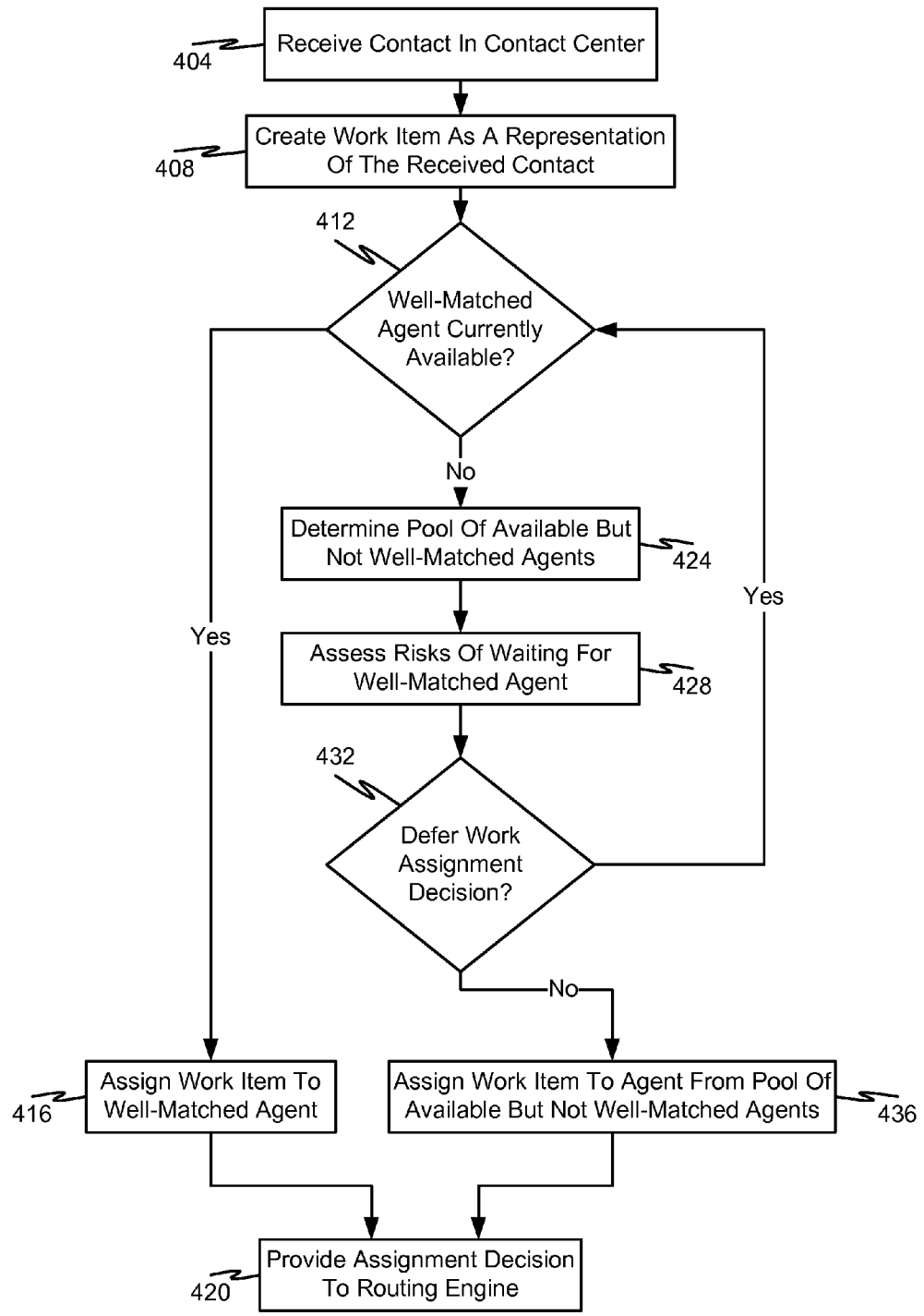
FIG. 4 is a flow diagram depicting a method of intelligently deferring work item routing decisions in accordance with embodiments of the present disclosure.

With reference now to FIG. 4, additional details related to the operation and use of the deferment rules 136 and risk analysis module 140 will be described in accordance with embodiments of the present disclosure.

The method begins when a contact is received at the contact center 100 (step 408). A contact may be received in any form such as a real-time, non-real-time, and near-real-time contact. Examples of contacts that may be received include inbound calls, outbound calls, emails, SMS messages, faxes, IM chat requests, combinations thereof, etc. Upon receiving the contact, one or more attributes or properties of the contact may be determined and a work item may then be created within the work assignment mechanism 116 to represent the received contact (step 408). The attributes of the work item may be obtained using any known mechanisms such as obtaining information from a customer database, analyzing caller identification information, receiving information from an IVR interaction with the customer, etc.

The work assignment engine 120 may inherently be aware of the attributes of resources 112 within the contact center 110 vis-à-vis access to information about the resource pool 212 and resource bitmap 216. The work assignment engine 120 may also determine the processing requirements of the work item based on its attributes. The work assignment engine 120 may comprise logic configured to compare the attributes of the work item with the attributes of all resources 112 in the contact center 100 to determine if a well-matched agent is currently available to process the work item (step 412). As can be appreciated, a "well-matched" agent may correspond to an agent that has a perceived value related to processing the work item that is greater than a perceived value of another agent processing the same work item. As a non-limiting example, a first agent may be considered well-matched as compared to a second agent if the first agent is predicted to process a work item in 10 minutes whereas the second agent is predicted to process the work item in 12 minutes. This prediction may be based on historical KPIs measured for the two agents, the assigned skill level of the two agents, history of each agent with the customer associated with the work item, etc. In some embodiments, it may be possible to consider a third agent well-matched as compared to the first and second agents if the third agent has a greater perceived value with respect to processing the same work item as compared to the first and second agents. Although estimated processing time is one way to determine a perceived value and, therefore, determine whether an agent is "well-matched" other metrics could be used to determine well-matched agents. For example, if an agent has previously worked with a particular customer and that particular customer has initiated a new contact, the agent that previously worked with the customer may be considered "well-matched" as compared to all other agents because of the perceived value associated with a common point of contact between the customer and the company. Other example metrics that can be used include estimated profit/call, historical profit/call, estimated customer satisfaction, historical customer satisfaction, combinations thereof, or any other historical or estimated KPI value.

If the work assignment engine 120 determines that a well-matched agent is current available, then the work assignment engine 120 can simply assign the work item to that well-matched agent (step 416) and instruct the routing engine 132 to connect the selected agent with the contact (step 420).

If, however, a well-matched agent is not currently available, then the work assignment engine 120 may determine the construction of the pool of available but not well-matched agents 232 (step 424). In this step, the work assignment engine 120 may also analyze the construction of the pool of well-matched but not available agents 228. In some embodiments, the work assignment engine 120 may analyze whether any agents are currently in the pool 232, how long it is estimated that one, some, or all agents will remain in the pool 232, whether any agents are currently in pool 228, how long it is estimated that an agent will migrate out of the pool 228 and become available, the costs/benefits associated with allowing an agent from pool 232 to process the work item now versus allowing an agent from pool 228 to process the work item later, combinations thereof, etc.

Based on the determinations made in step 424, the work assignment engine 120 may then invoke the risk analysis module 140 to compare the risks of waiting for an agent from pool 228 to become available versus the benefits (step 428) to determine whether the work assignment decision should continue to be deferred (step 432). Specifically, the risk analysis module 140 may determine whether the agents in the pool 232 are decreasing at a rate that could eliminate the option of assigning the work item to an agent in pool 232 before any other agent becomes available. The risk analysis module 140 may also analyze the agents in pool 228 to determine if any agent is estimated to become available before the agents from pool 232 are assigned to other work items. As can be appreciated, there are a number of possible ways in which the risk analysis module 140 may weigh the risks associated with waiting for a well-matched agent against the benefits associated with waiting.

In some embodiments, the risk analysis module 140 may consider WAT as part of the risk analysis. If the WAT is larger than a predetermined threshold, then the risk analysis module 140 may determine that the risks of waiting are too great and the deferment of the work assignment decision may be discontinued. Another way to use WAT to analyze the risks associated with waiting would be to compute the estimated number of assignment opportunities that exist for the work item as (objective−wait time)/WAT. This calculated number may be compared to an opportunity threshold to determine whether to allow deferment to continue. The risk analysis module 140 may also be configured to predict wait time for a well-matched agent and if that predicted wait time is less than a predicted time at which all agents from pool 232 are consumed, then the deferment may be discontinued.

If the query of step 432 is answered affirmatively (e.g., the risks associated with waiting for a well-matched agent are still within acceptable tolerances), then the method returns to step 412. If the query of step 432 is answered negatively (e.g., the risks associated with waiting for a well-matched agent are no longer within acceptable tolerances), then the method continues with the work assignment engine 120 assigning the work item to an agent from the pool of available but not well-matched agents 232 (step 436). The method then proceeds to step 420 to execute the results of the assignment decision.

It should be appreciated that the data obtained from determining when risks were to high to defer a work assignment decision can be useful in a closed loop feedback system. Specifically, the behavior of the system may be analyzed over time to determine how often and under what circumstances the risks of waiting for a well-matched agent were considered too high (e.g., due to predetermined thresholds). This information can be used to define other changes within the contact center. For instance, the risk thresholds may be altered if it is observed that certain SLOs are not being met. As another example, rather than adjusting the predetermined risk threshold, other changes in the contact center can be implemented to meet one or more SLOs such as, for example, adding agents to a particular shift, hiring more agents, changing agent schedules, etc. Thus, the analysis of risk tolerances and decisions to defer work assignment decisions can be used to influence other aspects of contact center behavior.

It should be appreciated that while embodiments of the present disclosure have been described in connection with a queueless contact center architecture, embodiments of the present disclosure are not so limited. In particular, those skilled in the contact center arts will appreciate that some or all of the concepts described herein may be utilized in a queue-based contact center or any other traditional contact center architecture.

Furthermore, in the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
   receiving a first contact in a contact center;
   creating a first work item as a representation of the first contact in the contact center;
   establishing a pool of agents within the contact center, each agent in the pool of agents being qualified to process the first work item, wherein the pool of agents being qualified to process the first work item comprises:
   at least one well-matched agent and at least one less-well-matched agent, wherein the at least one less-well-matched agent is not as well-matched for the first work item because they are not as qualified to process the first work item as the at least one well-matched agent in the contact center, and wherein the at least one well-matched agent is not available at the first time to process the first work item; and
   deferring a work assignment decision for the first work item beyond the first time while simultaneously considering a risk of not assigning the first work item to an agent in the pool of agents.

2. The method of claim 1, wherein considering the risk of not assigning the first work item to an agent in the pool of agents comprises determining a Weighted Advance Time (WAT) for at least one of the first work item, a work item having a common attribute with the first work item, and multiple work items having common attributes with the first work item.

3. The method of claim 2, further comprising:
   determining a current wait time for the first work item;
   determining a target wait time for the first work item; and
   based on the determined WAT, the determined current wait time, and the determined target wait time, determining whether or not to continue deferring the work assignment decision.

4. The method of claim 3, wherein the determination of whether or not to continue deferring the work assignment decision comprises calculating an estimated number of assignment opportunities according to the following: (the determined target wait time−the determined current wait time)/the determined WAT.

5. The method of claim 4, further comprising comparing the estimated number of assignment opportunities with a threshold.

6. The method of claim 2, further comprising:
   comparing the determined WAT with a predetermined threshold; and
   if the determined WAT is larger than the predetermined threshold, discontinuing deferment of the work assignment decision.

7. The method of claim 1, further comprising:
   estimating an amount of time until the at least one well-matched agent becomes available; and
   using the estimated amount of time to consider the risk of not assigning the first work item to an agent in the pool of agents.

8. The method of claim 1, wherein the risk of not assigning the first work item to an agent in the pool of agents includes a risk tolerance of a customer that initiated the first contact.

9. The method of claim 8, wherein the risk tolerance of the customer is determined by at least one of (i) analyzing historical contact information for the customer and (ii) asking the customer about their risk tolerance.

10. The method of claim 1, wherein the first contact is a real-time contact.

11. A non-transitory computer readable medium having stored thereon instructions that cause a computing system to execute a method, the instructions comprising:
    instructions configured to create a first work item as a representation of a first contact received in a contact center at a first time;
    instructions configured to analyze a pool of agents within the contact center, each agent in the pool of agents being qualified to process the first work item, wherein the pool of agents being qualified to process the first work item comprises:
    at least one well-matched agent and at least one less-well-matched agent, wherein the at least one less-well-matched agent is not as well-matched for the first work item because they are not as qualified to process the first work item as the at least one well-matched agent in the contact center, wherein the at least one well-matched agent is not available to process the first work item at the first time; and
    instructions configured to defer a work assignment decision for the first work item beyond the first time while simultaneously considering a risk of not assigning the first work item to an agent in the pool of agents.

12. The computer readable medium of claim 11, wherein considering the risk of not assigning the first work item to an agent in the pool of agents comprises determining a Weighted Advance Time (WAT) for at least one of the first work item, a work item having a common attribute with the first work item, and multiple work items having common attributes with the first work item.

13. The computer readable medium of claim 12, further comprising:
    instructions configured to determine a current wait time for the first work item;
    instructions configured to determine a target wait time for the first work item; and
    instructions configured to, based on the determined WAT, the determined current wait time, and the determined target wait time, determine whether or not to continue deferring the work assignment decision.

14. The computer readable medium of claim 13, wherein the determination of whether or not to continue deferring the work assignment decision comprises calculating an estimated number of assignment opportunities according to the following: (the determined target wait time−the determined current wait time)/the determined WAT.

15. The computer readable medium of claim 11, wherein the risk of not assigning the first work item to an agent in the pool of agents includes a risk tolerance of a customer that initiated the first contact.

16. The computer readable medium of claim 15, wherein the risk tolerance of the customer is determined by at least one of (i) analyzing historical contact information for the customer and (ii) asking the customer about their risk tolerance.

17. The computer readable medium of claim 11, wherein the first contact is a real-time contact.

18. A contact center, comprising:
   a work assignment mechanism including:
      a work assignment engine configured to create a first work item as a representation of a first contact received in a contact center at a first time, analyze a pool of agents within the contact center, each agent in the pool of agents being qualified to process the first work item, wherein the pool of agents being qualified to process the first work item comprises:
         at least one well-matched agent and at least one less-well-matched agent, wherein the at least one less-well-matched agent is not as well-matched for the first work item because they are not as qualified to process the first work item as the at least one well-matched agent in the contact center, wherein the at least one well-matched agent is not available at the first time to process the first work item, the work assignment engine comprising:
            deferment rules configured to defer a work assignment decision for the first work item beyond the first time; and
            a risk analysis module configured to simultaneously consider a risk of not assigning the first work item to an agent in the pool of agents.

19. The contact center of claim 18, wherein the risk analysis module is further configured to estimate an amount of time until the at least one well-matched agent becomes available.

20. The contact center of claim 18, further comprising a state monitor configured to determine a current state of the contact center and provide information regarding the current state of the contact center to the risk analysis module.

* * * * *